Jan. 13, 1925.  1,522,798
F. H. BEYEA
GROMMET OR ENDLESS CABLE
Filed Oct. 27, 1921
Fig. 1
Fig. 2
Fig. 3
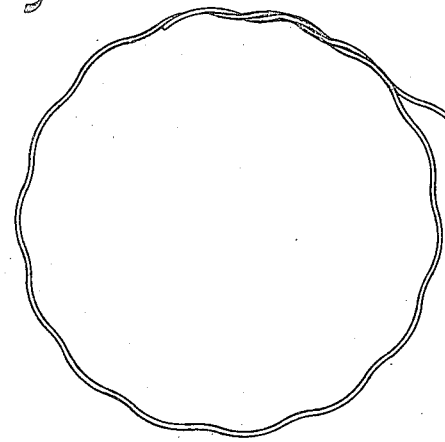
Fig. 5
Fig. 6
Fig. 7
Fig. 8
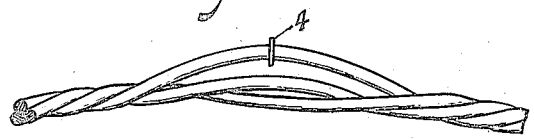
Fig. 4
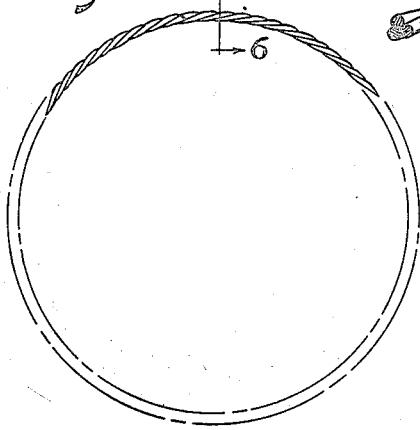
Fig. 9
Fig. 10
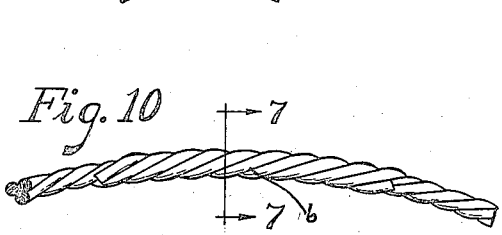
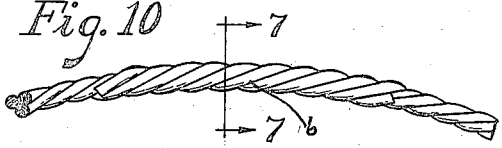
Inventor
Frank H. Beyea.
By G. L. E.
Atty Patented Jan. 13, 1925.

1,522,798

UNITED STATES PATENT OFFICE.

FRANK H. BEYEA, OF AKRON, OHIO, ASSIGNOR TO JOHN R. GAMMETER, OF AKRON, OHIO.

GROMMET OR ENDLESS CABLE.

Application filed October 27, 1921. Serial No. 510,944.

*To all whom it may concern:*

Be it known that I, FRANK H. BEYEA, a citizen of the United States, residing at Akron, in the county of Summit and State of Ohio, have invented certain new and useful Improvements in Grommet or Endless Cables, of which the following is a specification.

This invention relates to endless rings or grommets formed from wire or the like, which are adapted for many and varied uses, the particular use for which the grommet disclosed is intended, being in the manufacture of bead cores for pneumatic tires of the inextensible bead or straight side type.

The object of the invention is to produce an endless ring or cable wire, made from a single strand which will combine the maximum strength with lightness and economy of production.

In the drawings:

Fig. 1 is a view of a portion of a strand of wire such as used for the manufacture of the bead;

Fig. 2 is a modified form of wire;

Fig. 3 is a view showing the method of winding or laying up the bead core or grommet;

Fig. 4 is a view of the completed grommet;

Fig. 5 is a cross-section through a grommet made from the wire shown in Fig. 2;

Fig. 6 is a cross-section through a grommet made from the wire of Fig. 1, the view being taken on the line 6—6 of Fig. 4;

Fig. 7 is a cross-section on the line 7—7 of Fig. 10;

Fig. 8 is a view showing one method of uniting the ends of the wire;

Fig. 9 is a modified form of the connection shown in Fig. 8; and

Fig. 10 is a further modified form of connecting means for uniting the ends of the wire.

The object of the invention is to construct an endless wire cable or grommet from a single length of wire without a center or core wire. This object is attained by winding a single length of wire upon itself in a plurality of convolutions and uniting the ends of the wire. In order to obtain the best results the wire is wound upon itself three times, which in the case of a round or rounded wire will cause each convolution of wire to bear against the other convolutions obtaining a three-point contact, by which a perfect balance is obtained between the several turns.

The wire for the manufacture of the grommet or ring may be either round in cross-section as at 1 in Fig. 1 or it may be sector-shaped as shown in Fig. 2 and Fig. 5, in which case it is substantially a third of the circle of the complete bead. The wire, either in the form shown in Fig. 1 or in Fig. 2, is bent around to form a circle of size a trifle smaller than that desired for the completed bead and the remainder of the wire is wrapped about the first portion thereof until a complete three-wire grommet is obtained.

It is preferred to form the grommet from wire that has been crimped or spiraled before the wrapping operation takes place. This may be done as a part or incident to the wrapping operation, or the spiraling may, preferably, be done prior to or separate from the wrapping operation. In the latter case the wire is run through a spiraling die or similar machine which puts the proper and required spiral in the wire.

The preformed spiral wire of either form shown in Fig. 1 or Fig. 2 is assembled upon a spool or carrier shown in dotted lines at 3 in Fig. 3, and after the ring has been initially formed, the carrier is passed around the wire, the ring and spool being rotated relatively to one another, until these layers of wire have been wound upon each other.

It is not necessary that the ring be initially formed at the end of the wire, as it will be appreciated that similar results may be obtained where the ring is formed from the central portion of a length of wire and both ends wrapped about the ring.

It will be seen by an inspection of Figs. 5 and 6 that as a result of the construction of the three-wire grommet, each individual strand touches or bears against the other two strands, so that a three-point contact is obtained and the loads and stress to which the grommet is subjected, will be borne equally by all of the strands of wire.

When the wrapping operation is completed, the ends of the wire may be united in any well-known or preferred manner. Thus in Fig. 8 the ends of the wire may be lifted out slightly from the body of the grommet, and welded as at 4 in Fig. 8. This operation may be especially adapted for use in constructing the wire from soft or low carbon steel. In the case of a hard drawn or higher carbon steel wire, the joint may be made by brazing or soldering, the ends of the wire being preferably connected on a bevel or taper. This form is shown in Fig. 9 at 5. As a further modification the ends of the wire may overlapped a short distance, as shown at 6 in Fig. 10. In this case there will be four wires at the point of connection which will strengthen the cable at this point. In the form shown in Figs. 7 and 10 it is possible to rely upon the overlapping ends of the wire to hold the grommet to its correct size, or solder may be flowed over the point where the four wires are located. Other means may be provided for holding the ends of the wire together, those recited being shown in Figs. 7, 8 and 9, being examples only.

After the winding operation and the uniting of the ends of the wire, the grommet is placed on a stretching machine which stretches the ring to bring it to exact size and to cause the several coils of wire to hug one another closely and to assume their correct position. The bead core is now ready to be incorporated in the tire structure.

While the description of the invention has been detailed it will be understood that such description is only for the purpose of enabling one skilled in the art to practise the same and is not to be understood as limiting the invention, as variations and modifications may be made within the scope of the invention and within the limits of the claims.

Claims:

1. An endless cable or grommet, composed of a single wire wound upon itself in three convolutions, which convolutions are in spiral form, whereby each convolution bears upon all of the other convolutions at every point in the grommet.

2. An endless ring or cable composed of three strands of a spirally wound wire, the strands being connected at one point, and being inter-spiraled to obtain a three-point contact throughout the ring.

FRANK H. BEYEA.